3,730,894
PROCESS FOR INHIBITING FOAMING
Israel J. Heilweil, Princeton, and Richard I. Leavitt, Pennington, N.J., assignors to Mobil Oil Corporation
No Drawing. Filed Sept. 8, 1969, Ser. No. 856,198
Int. Cl. C10m 1/50, 1/28, 1/06
U.S. Cl. 252—16                                              10 Claims

ABSTRACT OF THE DISCLOSURE

This specification discloses inhibition of foaming in a liquid system containing water and a hydrocarbon. Inhibition is effected by the presence in the system of particles of a solid, insoluble material. These particles have a surface area of less than 50 square meters per gram and a portion of their surfaces is occupied by polar sites. Representative solid materials are poly-2,6-dimethyl-1,4-phenylene oxide, a copolymer of 2,6-dimethyl phenol and 2-methyl-1,6-tetradecyl phenol wherein the proportion of the latter compound does not exceed about 20 percent by weight of the copolymer, a copolymer of vinyl stearate and maleic anhydride, sublimed sulfur, silicon carbide, and polytetrafluoroethylene comminuted under cryogenic conditions.

BACKGROUND OF THE INVENTION

Field of the invention

This invention relates to the inhibition of foaming in a liquid system containing water and a hydrocarbon.

Description of the prior art

Inhibition of foaming can be effected in liquid systems by chemical means or physical means. Chemical means have included the addition to the system of liquid surfactants and other liquid compositions which either desorb the foam promoting agents from the incipient or forming foam droplets or decrease the drainage time of the foam film, or do both. Chemical means satisfactorily inhibit foaming but the use of such means is restricted to systems where the presence of the foam inhibiting agent is not deleterious to the system or the agent is not changed in the system to destroy its foam inhibiting effect. Mechanical means have included changing of pressure or temperature or both, the use of supersonic waves, particular designs of the vessel containing the liquid system, and agitation with propellers and similar devices.

Foam inhibition has also been effected by what may be termed a physicochemical method. In this method, there are added to the liquid system particles of a solid, insoluble material. This material has a high surface area and inhibits foaming by absorbing the agent promoting the formation of foam in the system. Such materials are exemplified by activated carbon. Zeolites have also been employed in liquid systems containing water and hydrocarbon for purposes other than inhibition of foaming. However, while the use of high surface area materials is effective, their use suffers from the disadvantage that once their surfaces are covered with the foam promoting agent, they have to be replaced, reprocessed, or both.

SUMMARY OF THE INVENTION

In accordance with the invention, there are provided (1) a method for inhibiting foaming in a liquid system containing water and a hydrocarbon and (2) a liquid system containing water and a hydrocarbon inhibited against foaming. Inhibition of foaming is effected by the presence in the liquid system of particles of an insoluble, solid material. The insoluble, solid material is characterized by having a surface area of less than 50 square meters per gram and having a portion of its surface occupied by polar sites. The particles, it is believed, inhibit foaming by effecting aggregation of incipient and developed bubbles on the polar sites, thereby causing the bubbles to collapse.

DESCRIPTION OF THE PREFERRED EMBODIMENTS

The invention is applicable with respect to any liquid system containing water and a hydrocarbon. The system may be predominantly water or may be predominantly hydrocarbon. Thus, the system may contain from about 1 percent of water to about 99 percent of hydrocarbon by weight to about 99 percent of water and about 1 percent of hydrocarbon by weight. The water in the system may be relatively pure water or may be a solution of inorganic or organic compounds. The hydrocarbon may be any hydrocarbon and will be in the liquid system in the liquid phase under the temperature and pressure conditions of the system. The system may be an emulsion of the water and the hydrocarbon and either the water or the hydrocarbon may be the continuous phase of the emulsion. The system may contain a natural agent that promotes foaming or may contain an agent deliberately added for a particular purpose, such as an emulsifying agent, that tends to promote foaming.

Liquid systems to which the invention is applicable include oil-containing liquids employed in the drilling of wells. These liquids are variously termed drilling fluids or drilling muds and consist of water and a hydrocarbon oil, and various solid materials such as clays, the water and oil being emulsified and either the oil or the water being the continuous phase of the emulsion. Gas such as hydrocarbon gas from the earth formations being drilled, or air entrained with the liquid during processing at the surface of the earth to remove earth cuttings, tends to effect foaming of the liquid. Foaming prevents proper pumping and processing of the liquid and foaming ordinarily cannot be tolerated. Such systems also include liquids employed in the cutting of metals and foaming of the liquids, as a result of agitation of the liquids in the presence of air, interferes with their proper functioning to assist in the cutting of the metals. Such systems also include those involved with water purification, steel and paper milling, and lubrication of machines and engines.

The invention is particularly applicable with respect to liquid water-hydrocarbon systems involved in microbiological processing operations. These operations include those wherein a hydrocarbon is employed as a substrate to provide a source of carbon for the growth of a microorganism and the cells of the microorganism are the desired product of the operation. Also included in these operations are those wherein a hydrocarbon is subjected to the fermentation action of a microorganism to obtain a desired conversion product of the hydrocarbon. In these operations, the hydrocarbon is subjected to the action of the microorganism in the presence of an aqueous solution of mineral nutrients required for the growth and activity of the microorganism. These operations are aerobic and the liquid reaction mixture is agitated during the reaction to ensure adequate contact of the air, and the hydrocarbon, with the aqueous, nutrient medium. The liquid reaction mixture will contain foaming agents naturally produced by action of the microorganisms on the hydrocarbon and the presence of these foaming agents during agitation of the liquid reaction mixture results in foaming of the mixture. Foaming is deleterious for a number of reasons. For example, the portion of the liquid reaction mixture represented by the foam is no longer subjected to the same degree of agitation as the portion represented by the remainder of the mixture. Additionally, foaming can cause spillage or carryover from the reaction vessel. Further, it can cause gas locking of pumps employed for transportation of the liquid reaction mixture from the reaction vessel.

Any solid, insoluble material having a surface area of less than 50 square meters per gram and having a portion of its surface occupied by polar sites is satisfactory for use in the practice of the invention. For purposes of this specification, this material will be termed the "solid, insoluble material." By insoluble is meant, of course, that the material is insoluble in the liquid water-hydrocarbon mixture in which it is employed to inhibit foaming. Satisfactory results have been obtained with a material such as poly-2,6-dimethyl-1,4-phenyloxide. Satisfactory results have also been obtained with a material such as a copolymer of 2,6-dimethyl phenol and 2-methyl-1,6-tetramethylphenol wherein the proportion of the 2-methyl-1,6-tetradecyl phenol does not exceed about 20 percent by weight of the copolymer. Another satisfactory material is a copolymer of vinyl stearate and maleic anhydride. Other satisfactory materials include sublimed sulfur and silicon carbide. Polytetrafluoroethylene (Teflon) is also satisfactory for use but only where this material has been comminuted under cryogenic conditions, i.e., at temperatures of the order of that of boiling liquid nitrogen. Apparently, the comminution under cryogenic conditions is essential in order to provide the polar sites on a portion of the surface of the material.

The particular solid, insoluble material to be employed is selected on the basis of its compatibility with the use to which the system is to be put. With a system involving action of a microorganism and a hydrocarbon, any of the solid, insoluble materials heretofore mentioned may be employed. With a system to be used for the lubrication of machines and engines, a solid, insoluble material such as silicon carbide, because of its hardness, may not be employed.

As stated previously, it is believed that the particles of the solid, insoluble material inhibit foaming by effecting aggregation of incipient and developed bubbles on the polar sites. With aggregation on the polar sites, the bubbles collapse. Thus, the particles of the solid, insoluble material form, in effect, a template for foam aggregation. With collapse of the bubble, the polar site on the particle of the solid, insoluble material is then ready for further aggregation of incipient and developed bubbles.

It is essential that the solid, insoluble material have a surface area of less than 50 square meters per gram. With larger surface areas per unit weight, the particles tend to adsorb the foaming agent in the system and with adsorption of the foaming agent the polar sites become covered and no longer function to aggregate incipient and developed bubbles. Thus, with surface areas of 50 or more square meters per gram, the particles will not be continuous in their action and will require replacement or reprocessing, or both, if further inhibition of foaming is to be effected in the system.

The particles of the solid, insoluble material may be employed in the liquid system in a wide range of proportions. Any proportion, regardless of how small, will result in some degree of inhibition of foaming. However, since, as mentioned above, the collapsed bubble will leave the polar site ready for further aggregation, small proportions of the solid, insoluble material will provide effective inhibition of foaming. The solid, insoluble material may be employed in proportions as low as about 0.005 percent by weight of the liquid system. Larger proportions may also be employed. For example, the proportion of the solid, insoluble material may be between 0.01 percent and 0.02 percent by weight of the liquid system. If desired, the proportion may be as high as about 0.5 to 1.0 percent by weight of the liquid system. However, while even greater proportions may be employed, the use of greater proportions is not ordinarily necessary or desirable.

The solid, insoluble material is employed in the liquid system, as mentioned, in particle form. The size of the particles is not critical. However, it is preferred that they be as small as possible consistent with the function of the liquid system and the necessity or desirability of removing the particles subsequently from the liquid system. Thus, with a lubricant, the particles are preferably of colloidal size. On the other hand, in a system involving the growth of microorganisms of fermentation of a hydrocarbon, the microorganism product or the fermentation product might desirably be free of the solid, insoluble material. In this case the particles should be of a size that would permit of ready separation from the product. Particle sizes of 25μ have been found to be satisfactory for certain applications.

As mentioned previously, the invention is particularly applicable to systems involving growth of microorganisms employing a hydrocarbon substrate as a source of carbon for the microorganisms or involving fermentation of a hydrocarbon. The solid, insoluble materials are, other than with respect to inhibition of foaming, inert. Thus, they do not interfere with the growth, or the fermentation action, of the microorganisms. Further, they are not consumed by the microorganisms and thus do not have to be replaced. Moreover, where their presence in the microorganism product or fermentation product is not desired, they can be readily removed by filtration, centrifugation, or otherwise. Additionally, and this is of particular advantage, they are capable, at least in some instances, of increasing the growth rate of the microorganisms.

The following examples will be illustrative of the invention.

EXAMPLE I

In this example, which serves as a control example for Examples II–VII, air, to create foam, was bubbled through a water-hydrocarbon system contained in a 250-milliliter volumetric cylinder provided with a coarse, fritted bubbler. The water-hydrocarbon system comprised 50 milliliters of water and 1 milliliter of n-decane. The system also contained 2 milliliters of a 0.1 percent solution of a nonionic detergent, namely, $[p\text{-}C_9H_{19}\cdot C_6H_4\cdot O$

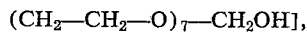

$(CH_2\text{—}CH_2\text{—}O)_7\text{—}CH_2OH]$, which served to act as a foaming agent. The air was passed through the system from the bubbler at room temperature and at a rate of 0.5 cubic foot per hour. When the foam volume became stable, it was measured. The foam volume was 105 milliliters.

EXAMPLE II

In this example, the procedure of the previous example was repeated except for the addition to the water-hydrocarbon system of 0.005 gram of particles of a solid, insoluble material consisting of poly - 2,6 - dimethyl-1,4-phenylene oxide. The particles had a surface area of less than 50 square meters per gram. Upon stabilization, the foam volume was 40 milliliters. Thus, the addition to the water-hydrocarbon system of the poly-2,6-dimethyl-1,4-phenylene oxide effected a reduction in foam volume upon stabilization from 105 milliliters to 40 milliliters.

EXAMPLE III

The same procedure as in Example II was carried out in this example except that the water-hydrocarbon system contained, as the solid, insoluble material, 0.005 gram of particles of a copolymer of 2,6-dimethyl phenol and 2-methyl-1,6-tetradecyl phenol. The copolymer contained 6 percent by weight of the 2-methyl-1,6-tetradecyl phenol and the particles had a surface area of 40 square meters per gram. Upon stabilization, the foam volume was 3 milliliters. Thus, with the copolymer in the system, the foam volume upon stabilization was 3 milliliters as compared to 105 milliliters.

EXAMPLE IV

In this example, the procedure of Example III was repeated except that the copolymer contained 12.7 percent by weight of the 2-methyl-1,6-tetradecyl phenol. The particles had a surface area of 14 square meters per gram. The foam volume upon stabilization was 40 milliliters. Thus, by employing the copolymer in the system, the foam volume was 40 milliliters whereas it would have been 105 milliliters.

EXAMPLE V

The same procedure as in Example II was carried out in this example except that the water-hydrocarbon system contained as the solid, insoluble material 0.005 gram of sublimed sulfur. The particles of the sublimed sulfur had a surface area of one square meter per gram. The foam volume stabilized at less than 10 milliliters. Thus, sublimed sulfur in the water-hydrocarbon system permitted a foam volume of 10 milliliters and in the absence of this sublimed sulfur it would have been 105 milliliters.

EXAMPLE VI

In this example, the procedure of Example II was repeated with the difference, however, that 0.005 gram of polytetrafluoroethylene in the form of particles having an effective diameter of $5\mu$ was added as the solid, insoluble material to the water-hydrocarbon system. The polytetrafluoroethylene particles were obtained by comminuting bulk polytetrafluoroethylene under cryogenic conditions and the particles had a surface area of 7 square meters per gram. The foam volume upon stabilization was less than 3 milliliters, as compared to 105 milliliters in the absence of any solid, insoluble material.

EXAMPLE VII

In this example, except for employing particles of a copolymer of vinyl stearate and maleic anhydride as the solid, insoluble material, the same procedure as in Example II was carried out. The copolymer contained 7.5 percent by weight of maleic anhydride and the particles had a surface area of less than 50 square meters per gram. The foam volume upon stabilization was 65 milliliters as compared to 105 milliliters in the absence of any solid, insoluble material.

The following two examples illustrate the effect of a solid, insoluble material for inhibiting foaming in water-hydrocarbon systems containing a foaming agent other than that employed in the seven examples above.

EXAMPLE VIII

In this example, which serves as a control example for the following example, the procedure of Example I was carried out with the exception that the foaming agent contained in the water-hydrocarbon system was polyoxyethylene sorbitan monolaurate containing 20 moles of ethylene oxide. The foam volume upon stabilization was 200 milliliters.

EXAMPLE IX

In this example, the same procedure as in Example VIII was carried out except that there was added to the water-hydrocarbon system as a solid, insoluble material, 0.005 gram of the polytetrafluoroethylene employed in Example VI. The foam volume upon stabilization was 23 milliliters. Thus, the solid, insoluble material was able to effect a foam volume of 23 milliliters, and in the absence of this material, the foam volume would have been 200 milliliters.

The following four examples illustrate the fact that the solid, insoluble material has an effect on inhibition of foaming of a water-hydrocarobn system that is not common to other types of liquid systems capable of foaming.

EXAMPLE X

In this example, air was bubbled through a water system contained in the same type of volumetric cylinder as employed in Example I. The water system comprised 50 milliliters of water and contained 2 milliliters of the same nonionic detergent employed in Example I and 0.005 gram of the same polytetrafluoroethylene employed in Example VI. Air was passed through the system from the bubbler at the same temperature and at the same rate as in Example I. The foam volume upon stabilization was 115 milliliters. It will be observed that this foam volume is comparable to that obtained in Example I where the system was a water-hydrocarbon system but did not contain polytetrafluoroethylene. Thus, the polytetrafluoroethylene is ineffective for inhibition of foam in a water system.

EXAMPLE XI

The procedure of Example X was repeated except that the water system was converted to a water-hydrocarbon system by the addition thereto of 1 milliliter of n-decane. Upon stabilization, the foam volume was 3 milliliters. Accordingly, it will be seen that, whereas the polytetrafluoroethylene in the water system was ineffective to inhibit foaming, it effected reduction of foam volume to 3 milliliters in the water-hydrocarbon system.

EXAMPLE XII

In this example, the procedure of Example X was repeated except that 0.005 gram of the copolymer of Example III was added to the water system. The foam volume upon stabilization was 200 milliliters. Thus, the copolymer of Example III was also ineffective for inhibition of foaming in a water system.

EXAMPLE XIII

In this example, the procedure of Example XII was repeated except that the water system was converted to a water-hydrocarbon system by the addition thereto of 1 milliliter of n-decane. The foam volume upon stabilization was 3 milliliters. Thus, it will be seen that the copolymer of Example III, while ineffective for inhibition of foaming in a water system, effectively inhibited foaming in a water-hydrocarbon system.

The following four examples will illustrate the invention in connection with procedures for the growth of microorganisms on a hydrocarbon substrate in a liquid water-hydrocarbon system. They also illustrate the effect of the solid, insoluble materials for increasing the growth rate of microorganisms.

EXAMPLE XIV

In this example, two liquid water-hydrocarbon systems contained in 48-millimeter diameter standard gas bubblers were inoculated with the microorganism, gram positive Brevibacterium sp. The liquid water-hydrocarbon systems comprised 100 milliliters of aqueous mineral salt medium and 1 milliliter of hexadecane. To the second of the systems was added 0.005 percent by weight of particles of a solid, insoluble material, namely, a copolymer of 2,6-dimethyl phenol and 2-methyl-1,6-tetradecyl phenol having a surface area of less than 50 square meters per gram. The copolymer contained 12 percent by weight of the 2-methyl-1,6-tetradecyl phenol. Humidified air was bubbled through each of the systems at a rate of 1.0 cubic foot per hour for a period of 20 hours at 25° C. Foam height and optical density were measured at the end of this period. Optical density is a measure of the extent to which the microorganism grew during the period of bubbling with air and was obtained at 400 m$\mu$, using the microorganism cells washed in 2-propanol diluted wtih 15 percent of water. The optical density can be converted to weight of cells using a factor 4.0=1 milligram per milliliter.

The foam height in the first system was 47 millimeters. Further, the optical density was 1.24, indicating growth of the microorganism. The foam height in the second system was 7 millimeters indicating the effectiveness of the copolymer for inhibiting foaming. Additionally, the optical density was 7.0 indicating that the copolymer was effective for increasing the growth rate of the microorganisms.

EXAMPLE XV

In this example, two liquid water-hydrocarbon systems contained in 250-milliliter Erlenmeyer shake flasks were inoculated with the microorganism, gram negative achromobacter. The liquid systems comprised 50 milliliters of aqueous salt medium and 0.5 milliliter of n-decane and the second liquid system contained 10.0 milligrams of silicon carbide in the form of fibers having lengths between 100 and 750 microns and diameters between 0.5 and 3.0 microns. The flasks were shaken for a period of 17 hours at 36° C. At the end of this period, the foam height was measured. The amount of nitrogen in the system was also measured. The amount of nitrogen in the system is a measure of the extent to which the microorganism has grown.

The foam height in the first system was 10 millimeters and the nitrogen content was 11.4 milligrams per 100 milliliters. The foam height in the second system was zero and the nitrogen content was 38 milligrams per 100 milliliters. It will be seen, accordingly, that the silicon carbide not only reduced the extent of foaming but also increased the growth rate of the microorganism.

EXAMPLE XVI

The procedure of the previous example was followed in this example, except that the microorganism employed was Brevibacterium sp. The solid, insoluble material employed in the second liquid water-hydrocarbon system was the polytetrafluoroethylene employed in Example VI, and the extent of the growth of the microorganism was measured as in Example XIV. The foam height in the first system was 30 millimeters and the optical density was 8.2. As compared to this, the foam height in the second system was zero and the optical density was 10.2, indicating the effect of the polytetrafluoroethylene in reducing foaming and increasing the rate of growth of the microorganism.

EXAMPLE XVII

The procedure of this example was the same as that in Example XVI except that 48-millimeter diameter standard gas bubblers were employed in place of the shake flasks. The foam height in the first system was 50 millimeters and the optical density was 1.25 whereas in the second system the foam height was 5 millimeters and the optical density was 1.95, again indicating the effect of the polytetrafluoroethylene in reducing foaming and increasing the rate of growth of the microorganism.

What is claimed is:

1. A process for inhibiting foaming in a liquid system containing water and a hydrocarbon comprising incorporating into said system particles of a solid, insoluble material, said particles having a surface area of less than 50 square meters per gram and having a portion of their surfaces occupied by polar sites, said solid, insoluble material being selected from the group consisting of poly-2,6-dimethyl-1,4-phenylene oxide, a copolymer of 2,6-dimehtyl phenol and 2-methyl-1,6-tetradecyl phenol wherein the proportion of the 2-methyl-1,6-tetradecyl phenol does not exceed about 20 percent by weight of the copolymer, a copolymer of vinyl stearate and maleic anhydride, silicon carbide, and polytetrafluoroethylene comminuted under cryogenic conditions.

2. The process of claim 1 wherein said solid, insoluble material is poly-2,6-dimethyl-1,4-phenylene oxide.

3. The process of claim 1 wherein said solid, insoluble material is a copolymer of 2,6-dimethyl phenol and 2-methyl-1,6-tetradecyl phenol wherein the proportion of 2-methyl-1,6-tetradecyl phenol does not exceed about 20 percent by weight of the copolymer.

4. The process of claim 1 wherein said solid, insoluble material is a copolymer of vinyl stearate and maleic anhydride.

5. A liquid system containing water and a hydrocarbon inhibited against foaming by containing therein particles of a solid, insoluble material, said particles having a surface area of less than 50 square meters per gram and having a portion of their surfaces occupied by polar sites, said solid, insoluble material being selected from the group consisting of poly-2,6-dimethyl-1,4-phenylene oxide, a copolymer of 2,6-dimethylphenol and 2-methyl-1,6-tetradecyl phenol wherein the proportion of the 2-methyl-1,6-tetradecyl phenol does not exceed about 20 percent by weight of the copolymer, a copolymer of vinyl stearate and maleic anhydride, silicon carbide, and polytetrafluoroethylene comminuted under cryogenic conditions.

6. The system of claim 5 wherein said solid, insoluble material is poly-2,6-dimethyl-1,4-phenylene oxide.

7. The system of claim 5 wherein said solid, insoluble material is a copolymer of 2,6-dimethyl phenol and 2-methyl-1,6-tetradecyl phenol wherein the proportion of 2-methyl-1,6-tetradecyl phenol does not exceed about 20 percent by weight of the copolymer.

8. The system of claim 5 wherein said solid, insoluble material is a copolymer of vinyl stearate and maleic anhydride.

9. A process for inhibiting foaming in a liquid system containing water and a hydrocarbon comprising incorporating into said system particles of a solid, insoluble material, said particles having a surface area of less than 50 square meters per gram and having a portion of their surfaces occupied by polar sites, said solid, insoluble material being polytetrafluoroethylene comminuted under cryogenic conditions.

10. A liquid system containing water and a hydrocarbon inhibited against foaming by containing therein particles of a solid, insoluble material, said particles having a surface area of less than 50 square meters per gram and having a portion of their surfaces occupied by polar sites, said solid, insoluble material being polytetrafluoroethylene comminuted under cryogenic conditions.

References Cited

UNITED STATES PATENTS

| | | | |
|---|---|---|---|
| 2,503,014 | 4/1950 | Webber | 252—325 |
| 3,126,313 | 3/1964 | Johnson | 252—49.5 X |
| 3,445,399 | 5/1969 | Jander | 252—324 |

DANIEL E. WYMAN, Primary Examiner

W. H. CANNON, Assistant Examiner

U.S. Cl. X.R.

195—107; 252—8.5 P, 25, 27, 49.5, 321, 324, 325, 358